(12) United States Patent
Fan

(10) Patent No.: US 9,163,316 B2
(45) Date of Patent: Oct. 20, 2015

(54) METHOD FOR PRODUCING METHANOL FROM METHANE

(71) Applicant: Gas Technology Institute, Des Plaines, IL (US)

(72) Inventor: Qinbai Fan, Chicago, IL (US)

(73) Assignee: Gas Technology Institute, Des Plaines, IL (US)

( * ) Notice: Subject to any disclaimer, the term of this patent is extended or adjusted under 35 U.S.C. 154(b) by 386 days.

(21) Appl. No.: 13/670,501

(22) Filed: Nov. 7, 2012

(65) Prior Publication Data

US 2014/0124381 A1    May 8, 2014

(51) Int. Cl.
*C25B 3/02* (2006.01)
*H01M 8/06* (2006.01)
*C25B 1/04* (2006.01)
*C25B 1/08* (2006.01)

(52) U.S. Cl.
CPC .... *C25B 3/02* (2013.01); *C25B 1/08* (2013.01)

(58) Field of Classification Search
CPC .............. C25B 3/02; C25B 3/00; C25B 3/105
USPC ........................................................ 205/452
See application file for complete search history.

(56) References Cited

U.S. PATENT DOCUMENTS

| 4,462,876 A | 7/1984 | DeLue et al. |
| 5,051,156 A | 9/1991 | Scharifker et al. |
| 8,088,261 B2 | 1/2012 | Fan et al. |
| 2008/0245660 A1 | 10/2008 | Little et al. |

FOREIGN PATENT DOCUMENTS

EP    2 730 638 A1    5/2014

OTHER PUBLICATIONS

B. Lee et al., "Efficient and Selective Formation of Methanol From Methane in a Fuel Cell-Type Reactor", Jnl of Catalysis, 2011, v. 279, pp. 233-240.

*Primary Examiner* — Nicholas A Smith
*Assistant Examiner* — Leo Ahnn
(74) *Attorney, Agent, or Firm* — Pauley Erickson & Kottis

(57) ABSTRACT

A method for producing methanol from methane in which methane is provided to an anode electrode having a metal oxide catalyst disposed on an anode side of an electrolyte membrane, thereby producing methanol and electrons on the anode side. The electrons are conducted to a cathode electrode disposed on a cathode side of the electrolyte membrane, thereby transforming water provided to the cathode side to $H_2$ gas and hydroxide ions. The method is carried out at a temperature less than or equal to about 160° C., preferably at room temperature.

16 Claims, 5 Drawing Sheets

METHOD FOR PRODUCING METHANOL FROM METHANE

BACKGROUND OF THE INVENTION

1. Field of the Invention

This invention relates to a method for producing methanol from methane. In one aspect, this invention relates to a method for electrochemically producing methanol from methane. In one aspect, this invention relates to electrochemical devices for producing methanol from methane.

2. Description of Related Prior art

Methane is an abundant fuel especially with the development and production of shale gas. However, it is underutilized as a precursor for chemicals and liquid fuels due to the difficulty of transporting the gas, particularly with scattered shale gas supplies. Methanol is one of the 25 top chemicals produced worldwide; it is the main feedstock for the chemical industry; and it is a source of dimethyl ether (DME), which could be used as a vehicular fuel.

Methanol is conventionally produced from a Fischer-Tropsch reaction via the high temperature steam reforming of methane followed by high pressure reaction of the reformate hydrogen and CO. The efficiency is only about 50-65% depending on the waste heat recovery. Thus, highly efficient and cost effective conversion of methane to methanol is very much desired. While there have been considerable attempts to oxidize methane to methanol over solid catalysts in single-pass processes, none have been recognized to be practical. The reasons are: 1) methane is quite inert and generally requires temperatures greater than about 400° C. to react; and 2) methanol is produced as an intermediate product, thus limiting yield and selectivity. Some studies have reported the direct conversion of methane to methanol at slightly lower temperatures, still typically greater than about 300° C., using oxidants stronger than oxygen, such as $N_2O$, hydrogen peroxide, and ozone. However, such oxidants are not practical for high volume production due to cost.

FIGS. 1a-1c show a comparison of known technologies for direct conversion of methane to methanol at low temperatures. As used herein, the term "low temperature" refers to temperatures less than or equal to about 160° C. These technologies include a fuel cell type reaction, an internal short fuel cell type design and a metal oxide cation mediated reaction.

The electrochemical method to convert methane to methanol uses the concept that a strong oxidative O* radical intermediate is generated at the cathode electrode in a fuel cell type reactor (FIG. 1a) or in an internal short fuel cell type reactor (FIG. 1b). In this reactor, hydrogen gas is supplied to the anode side to produce protons and oxygen at the cathode side reacts with the protons from the anode to generate hydrogen peroxide intermediates, which contain strong oxidative O* species. Methane then reacts with the O* species to produce methanol. U.S. Pat. No. 5,051,156 teaches that methane activation may be performed at the anode and oxygen feeding at the cathode as a fuel cell reaction, which is quite similar to a high temperature solid oxide fuel cell with partial oxidation.

To avoid the use of hydrogen, it is known to use an intermediate temperature system. In this system, water, oxygen, and methane are supplied to a reactor with an applied galvanic current. Water is decomposed to oxygen and protons at the anode and methane reacts with oxygen and protons at the cathode. The methane is oxidized to methanol at temperatures greater than about 300° C.

Transition-metal oxide cations have been used to oxidize C—H and C—C bonds to produce more valuable products.

The direct oxidation of methane to methanol is the simplest oxidation process (FIG. 1c). It is known that metal oxide cations can convert methane to methanol directly. Suitable metal cations include Mn, Fe, Co, Ni, Ru, Rh, Ir, Pt, and possibly others. However, the direct conversion has several issues including the requirement for oxygen separation from air, low product yield, and low selectivity for the desired product.

Metal oxide cations, $MO^+$, may be produced by oxygen reacting with $M^+$ in accordance with the following reactions:

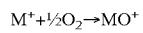

$$M^+ + \tfrac{1}{2}O_2 \rightarrow MO^+$$

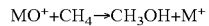

$$MO^+ + CH_4 \rightarrow CH_3OH + M^+$$

However, this chemical reaction is limited by the formation of $M^+$ and $MO^+$ and continuous regeneration of the $MO^+$ catalyst is required to continuously produce the liquid methanol with high selectivity. The most reactive ions are $MnO^+$, $FeO^+$, $NiO^+$, $OsO^+$, and $PtO^+$. The metal oxide cations react with methane to produce methanol. However, these reactive metal oxide cations require pure oxygen for regeneration. Ideally, the direct methods should have an economic advantage over indirect methods, but to date, no direct processes have progressed to a commercially acceptable stage, largely due to low product yields.

Metal oxide cations have been investigated as catalytic intermediates to oxidize methane to produce liquid methanol and the methane to methanol conversion using metal oxide cations which selectively produce methanol by oxidizing methane at low temperatures has been reported. This reaction has been investigated using computational modeling and spectroscopic monitoring to find the reaction mechanisms. However, no practical industrial reactors have been built due to the catalyst lifetime, reactivity, mass transfer limitations, and selectivity.

Table 1 contains a comparison of the known low temperature technologies for direct conversion of methane to methanol.

TABLE 1

Comparison of low temperature technologies for methane to methanol conversion

| | Anode | Cathode |
| --- | --- | --- |
| Fuel cell type | Hydrogen feed to produce protons | Oxygen feed to react with protons from anode and produce peroxide intermediate, which reacts with methane to produce methanol |
| Micro-cell | This is an internal short fuel cell type particle reaction | Oxygen produced on site reacts with methane to produce methanol |
| Metal oxide cation | Oxygen generated metal oxide cations react with methane to form methanol. The oxygen needs to be separated from air. | |

SUMMARY OF THE INVENTION

It is one object of this invention to provide a method for direct conversion of methane to methanol at low temperatures that eliminates the shortcomings of conventional technologies for such conversions.

This and other objects of this invention are addressed by an electrochemical device having an anode electrode, a cathode electrode, and an electrolyte membrane disposed between the electrodes in which methane is provided to the anode electrode, water is provided to the cathode electrode, and the electrochemical device is electrochemically overcharged at a temperature less than or equal to about 160° C., thereby producing methanol and electrons at the anode electrode and $H_2$ gas and hydroxide ions at the cathode electrode.

The advantages of this method include the fact that no gas separation is needed, especially at the anode, because the high oxidative oxygen is generated on site, the reaction temperature is less than about 160° C. and may be as low as room temperature, the cathode produces hydrogen, which is also a fuel for low temperature fuel cells or for blending with methane for combustion to reduce $NO_x$ emissions, the system may be either an alkaline or acidic environment, the anode catalyst is a metal oxide, which is regenerated by an electrolysis process, and the entire cell structure is easy to scale-up.

BRIEF DESCRIPTION OF THE DRAWINGS

These and other objects and features of this invention will be better understood from the following detailed description taken in conjunction with the drawings, wherein.

DETAILED DESCRIPTION OF THE PRESENTLY PREFERRED EMBODIMENTS

The method of this invention utilizes inorganic metal oxide cation intermediates as catalysts to oxidize methane to methanol at temperatures less than or equal to about 160° C., preferably, at room temperature. The metal oxide cation intermediates, which, upon reaction, are transformed to a noncatalytic form, are regenerated electrochemically at the anode in a battery-type reactor with hydrogen production at the cathode. Thus, this method produces methanol and hydrogen from methane and water at room temperature with high efficiency and high selectivity without using a high temperature Fischer-Tropsch process. As used herein, the term "high efficiency" refers to efficiencies greater than about 80%, and the term "high selectivity" refers to selectivities greater than about 90%.

Accordingly, the methane to methanol process of this invention applies an electrochemical process to continuously maintain the catalytic property of the metal oxide anode. In this process, methane is fed to the anode, producing methanol and electrons. The electrons are conducted to the cathode where they transform water provided to the cathode to $H_2$ gas and hydroxide ions. The hydroxide ions are transferred through the membrane separator disposed between the anode and cathode electrodes to the anode for regeneration of the oxidation metal oxide cation catalyst. The process is continuous as long as sufficient electrical current is applied. Although regeneration of an anode oxidation catalyst is a known technology practiced in batteries, such technology as practiced is unsuitable for methane to methanol conversion because the anode compositional and structural engineering and design are unsuitable for this purpose.

Figure 1A:
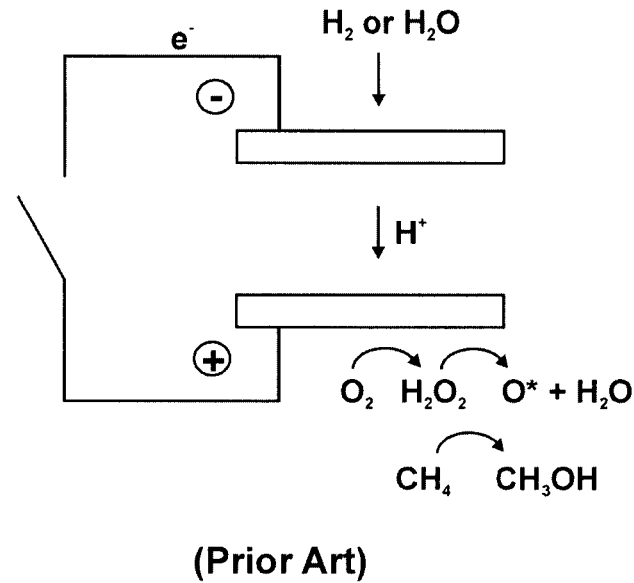
FIGS. 1a-1c show three conventional low temperature technologies for conversion of methane to methanol.
Figure 1B:
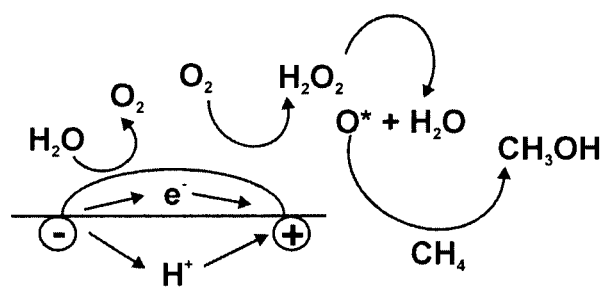
Figure 1C:
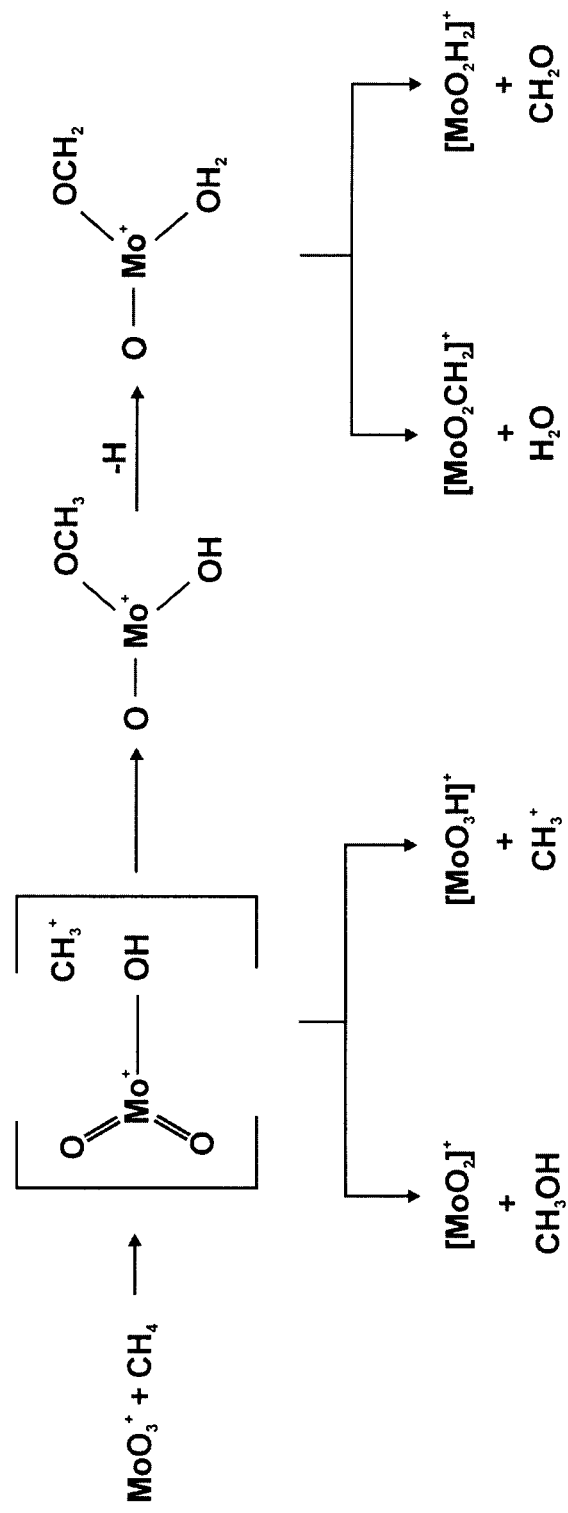
Figure 2:
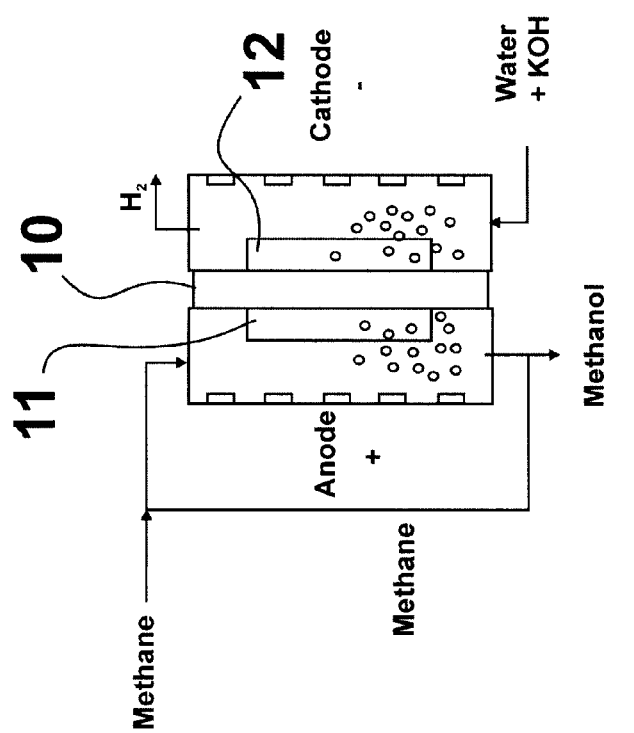
FIG. 2 is a diagrammatic representation of the technology for conversion of methane to methanol at low temperatures in accordance with this invention.

FIG. 2 is a schematic diagram showing the methane to methanol process in accordance with one embodiment of this invention in an exemplary electrochemical cell comprising an electrolyte membrane 10 disposed between an anode and cathode, a metal oxide catalyst 11 disposed on the anode side of the electrolyte membrane and a hydrogen evolution catalyst 12 disposed on the cathode side of the electrolyte membrane. Suitable hydrogen evolution catalysts are selected from the group consisting of Group VIII metals of the Periodic Table of the Elements and combinations thereof. As previously indicated, the system may be in an alkaline environment or an acidic environment. In an alkaline system in accordance with one embodiment of this invention, the electrolyte membrane comprises an alkaline electrolyte. In accordance with one embodiment, the electrolyte membrane is a porous polymer layer containing an alkaline electrolyte. An alkaline electrolyte is preferred because, in an alkaline solution, the oxygen overpotential is much lower than that in an acidic solution. In an acidic solution, a proton exchange membrane may be used. In an exemplary alkaline cell, the reactions are:

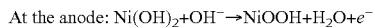
At the anode: $Ni(OH)_2 + OH^- \rightarrow NiOOH + H_2O + e^-$

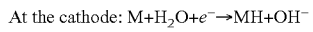
At the cathode: $M + H_2O + e^- \rightarrow MH + OH^-$

These are traditional nickel metal hydride battery reactions in which NiOOH could be $NiO^+ \cdot OH^-$. The $NiO^+$ may be generated by an electrochemical charge. In the presence of methane molecules, the reactions at the anode are:

$Ni(OH)_2 + OH^- + CH_4 \rightarrow CH_3OH + [M^+] + OH^- + H_2O + e^-$ or

$Ni(OH)_2 + CH_4 \rightarrow CH_3OH + [M^+] + H_2O + e^-$

The intermediate [M$^+$] reacts with oxygen from the electrolysis of water, i.e. overcharging of the battery to decompose water. For example, the reaction at the cathode when the battery is overcharged is:

$Ni(OH)_2 + 5OH^- \rightarrow NiOOH + 3H_2O + O_2 + 5e^-$

Figure 3:
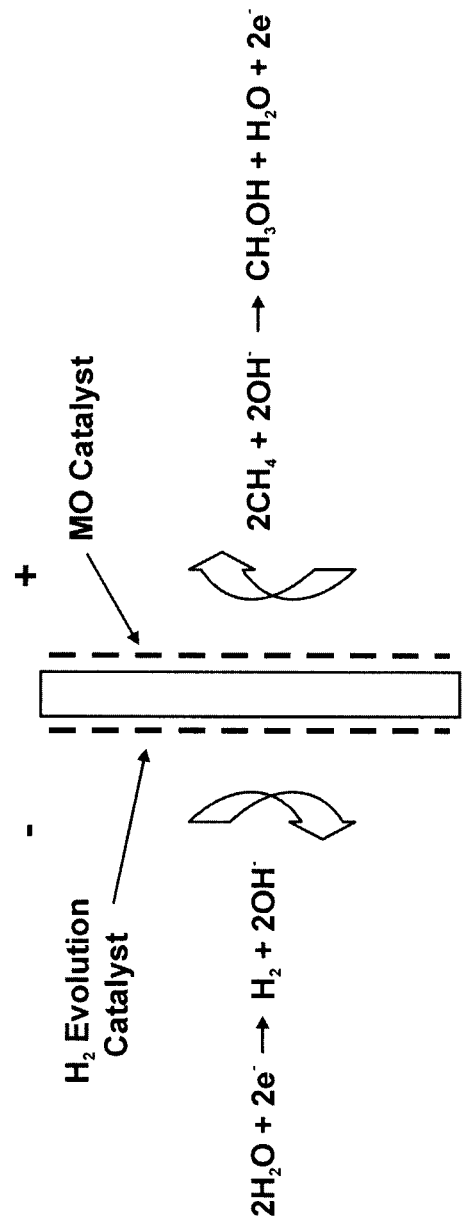
FIG. 3 is a diagrammatic representation of a membrane for use in the method of this invention and the reactions associated therewith.

As shown in FIG. 3, the product at the cathode is hydrogen, which may be employed as a fuel.

Using an electrochemical technique in accordance with the method of this invention, metal oxide cations are continuously produced. For example, $FeO^+$ may be produced by discharging an Fe/air battery. In this case, the Fe/C negative electrode follows the reaction:

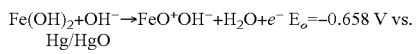
$Fe(OH)_2 + OH^- \rightarrow FeO^+OH^- + H_2O + e^-$ $E_o = -0.658$ V vs. Hg/HgO Metal oxide cations with hydroxides (for example, FeOOH, MnOOH etc) are strong oxidants and are used to destruct organic waste. As used herein, the term, "strong oxidants" refers to species, such as oxygen radicals (O*), peroxides ($O_2^{2-}$), super oxides ($O_2^-$), ozonides ($O_3^-$), and metal oxide cations (MO$^+$), having a stronger tendency to obtain electrons than oxygen molecules ($O_2$). These species may be intermediates in a series of reactions, such as the disclosed invention. These kinds of strong oxidants react with methane to generate methanol with catalytic activities.

Conventional nickel hydroxide battery electrodes use β-Ni(OH)$_2$, which becomes β-NiOOH after charging. This β/β cycle provides adequate electronic conductivity with acceptable volume changes during cycling to yield high utilization of the active materials. β-Ni(OH)$_2$ is a good candidate for the methane to methanol process. It has a well-defined crystalline structure and is commercially available. Other metal hydroxides such as Zn, Mn, Fe, and Co, can be considered along with β-Ni(OH)$_2$ or work independently. These metal hydroxides can generate metal oxide cations for methane oxidation in accordance with the following reactions.

At the anode:

Battery charging: $M(OH)_2+OH^-\rightarrow MO^+OH+H_2O+e^-$

Methane oxidation: $MO^+OH^-+CH_4\rightarrow CH_3OH+OH^-+M^+$

Oxygen generation: $2OH^-\rightarrow \frac{1}{2}O_2+H_2O+2e^-$

Metal oxide cation regeneration: $M^++\frac{1}{2}O_2\rightarrow MO^+$

Catalyst-anion recombination: $MO^++OH^-\rightarrow MO^+OH^-$

Total anode reaction: $M(OH)_2+CH_4+3OH^-\rightarrow MO^+OH^-+CH_3OH+2H_2O+3e^-$ At the cathode:

Battery Charging: $M+H_2O+e^-\rightarrow M-H+OH^-$

Hydrogen Evolution: $M-H\rightarrow M+\frac{1}{2}H_2$

Total cathode reaction: $H_2O+e^-\rightarrow OH^-+\frac{1}{2}H_2$

Net reaction: $CH_4+H_2O\rightarrow CH_3OH+H_2$

In accordance with the above reactions, hydrogen is produced at the cathode and methanol is produced at the anode. The products are fully separated by the membrane separator. Alkaline electrolyte supply, e.g. KOH addition as shown in FIG. 2, is controlled at the cathode side with limited migration to the anode (electro-osmotic drag). Methanol produced at the anode is carried out with methane and condensed as a liquid. Methanol concentration is more than 47 wt %. The methanol with this concentration can be shown to be economically separated from water. System management enables effective separation of methanol from methane. Hydrogen gas, a very important gas for refinery, food, steel industries, as a byproduct may be compressed and stored for different applications. Successful methane to methanol production in accordance with the method of this invention can drastically change the chemical industry.

Figure 4:
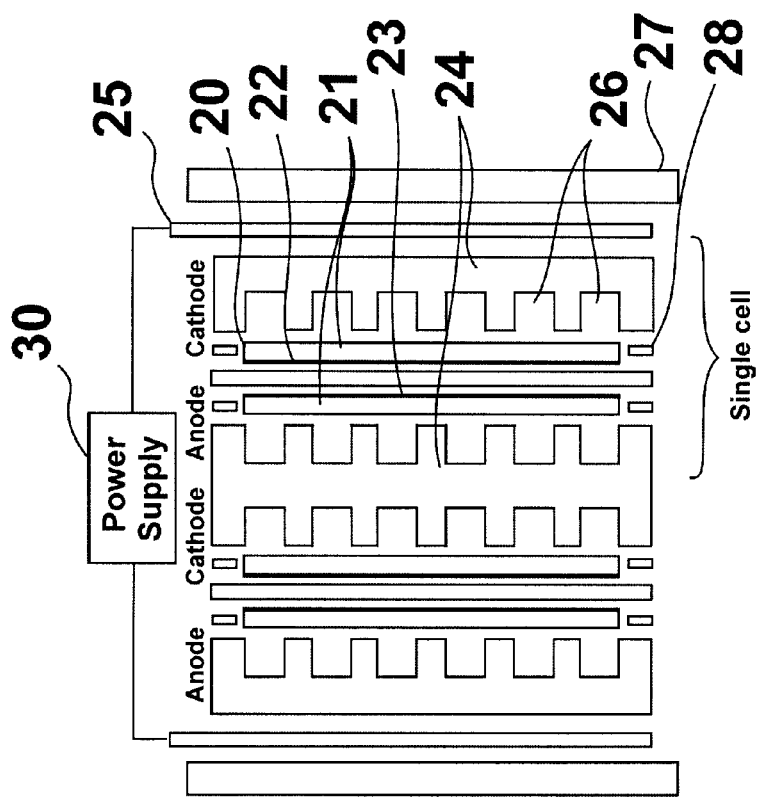
FIG. 4 is a diagram showing a methane to methanol reactor for carrying out the method in accordance with one embodiment of this invention.

FIG. 4 shows a gas-to-liquid reactor for use in accordance with one embodiment of the method of this invention. The reactor as shown comprises two cells. Each cell comprises a membrane separator 20 disposed between gas diffusion electrodes 21. In accordance with one preferred embodiment of this invention, the membrane separator has a thickness in a range of about 20-50 μm and the gas diffusion electrodes have a thickness in a range of about 200-300 μm. The cathode electrode comprises a hydrogen evolution catalyst layer 22 and the anode electrode comprises a NiOOH catalyst layer 23. A bipolar plate 24 separates the individual cells from one another and are configured to provide flow channels 26. The apparatus further comprises current collector 25 disposed between the bipolar plate 24 and end plate 27. Power supply 30 provides an electrical current to the cells. This setup is a combination of fuel cell technology and nickel metal hydride battery technology for which all of the materials are commercially available.

The components for an electrochemical cell in accordance with one embodiment of this invention may be produced in accordance with the following exemplary descriptions.

For nickel anode electrode preparation, nickel anode electrodes may be fabricated by preparing a nickel-hydroxide slurry. The slurry is a water-based blend of nickel hydroxide and cobalt-containing powders. To ensure good electronic conductivity in the final electrode, the water-based nickel-hydroxide paste is mixed with extrafine cobalt metal powder and cobalt-monoxide powder. Polyvinyl alcohol solution is then added as a binder to increase the mechanical stability of the electrodes. After mixing, the paste is applied into nickel foam or on carbon cloth. Other metal oxides, such as Fe, Mn oxides, may be added similar to the cobalt oxides.

For cathode metal hydride electrode preparation, AB$_2$ and AB$_5$-type alloys may be mixed with VULCAN-XC-72 and TEFLON emulsion as a binder. Elements "A" are strongly exothermic hydrogen absorbers (e.g. Ti, Zr, La, etc.) and elements "B" are either endothermic or slightly exothermic hydrogen absorbers (e.g. Ni, Fe, Co, Mn, etc.). For example, LaNi$_5$ is a AB$_5$ type material for hydrogen absorption. The slurry may be cold-pressed into nickel foam or on carbon cloth. When the cathode is under charge, hydrogen gas evolves.

Electrode separators for the cell assembly may be commercially available porous polyethylene, polypropylene fibers, to hold sufficient electrolyte for the reactor. Bipolar plates may be molded graphite plates having optimized flow channel design for liquid and gas flows. The plates are impermeable to liquid methanol and gases.

For a mass production of methanol from methane using this technology, off-peak electricity or renewable solar or wind electricity could be accompanied with shale gas production to make methanol for easy transportation of the fuel.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

What is claimed is:

1. A method for producing methanol from methane comprising the steps of:
   a) providing methane to an anode electrode comprising a metal oxide catalyst (M(OH)$_2$) disposed on an anode side of an electrolyte membrane, producing methanol and electrons on said anode side via the following chemical reactions:

$M(OH)_2+OH^-\rightarrow MO^+OH^-+H_2O+e^-$ $MO^+OH^-+CH_4\rightarrow CH_3OH+OH^-+M^+$, wherein the methanol comprises liquid methanol and is recovered from the anode side without requiring gas separation;
   b) conducting said electrons to a cathode electrode disposed on a cathode side of said electrolyte membrane, and providing a catalyst to the cathode side selected from the group consisting of Group VIII metals of the Periodic Table of Elements and combinations thereof, thereby transforming water provided to said cathode side to H$_2$ gas and hydroxide ions, said steps a) and b) being carried out at a temperature less than or equal to about 160° C.; and
   c) transferring the hydroxide ions through the electrolyte membrane to the anode side, thereby regenerating the metal oxide catalyst by the following chemical reactions:

$2OH^-\rightarrow \frac{1}{2}O_2+H_2O+2e^-$ $M^++\frac{1}{2}O_2\rightarrow MO^+$ $MO^+ + OH^- \rightarrow MO^+OH^-$ wherein the method is performed continuously by applying an electrical current to electrochemically regenerate the metal oxide catalyst.

2. The method of claim 1, wherein said metal oxide catalyst comprises a metal selected from the group consisting of Mo, Pt, Fe, Mn, Ni, and combinations thereof.

3. The method of claim 1, wherein said electrolyte membrane comprises an alkaline electrolyte.

4. The method of claim 3, wherein said electrolyte membrane comprises a porous polymer layer containing said alkaline electrolyte.

5. The method of claim 4, wherein said alkaline electrolyte is provided to said porous polymer layer from said cathode side of said electrolyte membrane.

6. The method of claim 1, wherein the catalyst provided to the cathode side comprises a hydrogen evolution catalyst.

7. A method of producing methanol, comprising the steps of:
providing an electrochemical device having an anode electrode, a cathode electrode, and an electrolyte membrane disposed between said electrodes wherein the anode electrode comprises a metal oxide catalyst $(M(OH)_2)$ and is disposed on an anode side of the electrolyte membrane;
providing methane to said anode electrode;
providing water and a catalyst selected from the group consisting of Group VIII metals of the Periodic Table of Elements and combinations thereof to said cathode electrode;
electrochemically overcharging said electrochemical device at a temperature less than or equal to about 160° C., thereby producing methanol and electrons at said anode electrode and $H_2$ gas and hydroxide ions at said cathode electrode via the following chemical reactions:

$M(OH)_2 + OH^- \rightarrow MO^+OH^- + H_2O + e^-$ $MO^+OH^- + CH_4 \rightarrow CH_3OH + OH^- + M^+$, wherein the methanol comprises liquid methanol and is recovered from the anode side without requiring gas separation; and
transferring the hydroxide ions through the electrolyte membrane to the anode side, thereby regenerating the metal oxide catalyst by the following chemical reactions:

$2OH^- \rightarrow \frac{1}{2}O_2 + H_2O + 2e^-$ $M^+ + \frac{1}{2}O_2 \rightarrow MO^+$ $MO^+ + OH^- \rightarrow MO^+OH^-$ wherein the method is performed continuously by applying an electrical current to electrochemically regenerate the metal oxide catalyst.

8. The method of claim 7, wherein said electrochemical device functions in a battery mode or an electrolyzer mode.

9. The method of claim 7, wherein said electrolyte membrane comprises an alkaline electrolyte.

10. The method of claim 7, wherein said electrochemical device is electrochemically overcharged at room temperature.

11. The method of claim 7, wherein said anode electrode comprises a metal oxide catalyst.

12. The method of claim 11, wherein said metal oxide catalyst comprises a metal selected from the group consisting of Mo, Pt, Fe, Mn, Ni, and combinations thereof.

13. The method of claim 7, wherein the catalyst provided to the cathode side comprises a hydrogen evolution catalyst.

14. The method of claim 9, wherein said electrolyte membrane comprises a porous polymer layer containing said alkaline electrolyte.

15. The method of claim 14, wherein said alkaline electrolyte is provided to said porous polymer layer from a cathode side of said electrolyte membrane.

16. The method of claim 7, wherein said electrochemical device is continuously electrochemically overcharged.

* * * * *